United States Patent
Manabe

(10) Patent No.: US 9,569,374 B2
(45) Date of Patent: *Feb. 14, 2017

(54) INFORMATION PROCESSING APPARATUS, INFORMATION PROCESSING METHOD, AND PROGRAM

(71) Applicant: Sony Corporation, Tokyo (JP)

(72) Inventor: Yoshihiro Manabe, Tokyo (JP)

(73) Assignee: Sony Corporation, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 14/572,706

(22) Filed: Dec. 16, 2014

(65) Prior Publication Data

US 2015/0106535 A1    Apr. 16, 2015

Related U.S. Application Data

(63) Continuation of application No. 13/779,171, filed on Feb. 27, 2013, now Pat. No. 8,954,630.

(30) Foreign Application Priority Data

Mar. 23, 2012  (JP) ................. 2012-067035

(51) Int. Cl.
 *G06F 3/00*     (2006.01)
 *G06F 13/10*    (2006.01)
 *G06F 11/30*    (2006.01)

(52) U.S. Cl.
 CPC ......... *G06F 13/102* (2013.01); *G06F 11/3006* (2013.01); *G06F 11/3048* (2013.01); *G06F 11/3055* (2013.01); *G06F 13/10* (2013.01)

(58) Field of Classification Search
 CPC .... G06F 13/10; G06F 11/3006; G06F 13/102; G06F 11/3055; G06F 11/3048
 USPC ........................................... 710/17
 See application file for complete search history.

(56) References Cited

U.S. PATENT DOCUMENTS

| | | | |
|---|---|---|---|
| 2008/0080397 A1 | 4/2008 | Niranjan et al. | |
| 2009/0094611 A1* | 4/2009 | Danne ................. | G06F 9/5033 718/105 |
| 2013/0254432 A1 | 9/2013 | Manabe | |

FOREIGN PATENT DOCUMENTS

JP          2011-253370 A    12/2011

\* cited by examiner

*Primary Examiner* — Chun-Kuan Lee
(74) *Attorney, Agent, or Firm* — Wolf, Greenfield & Sacks, P.C.

(57) ABSTRACT

There is provided an information processing apparatus including a device detection part configured to detect a second execution device that is identical or similar to a first execution device which executes a command, and an execution control part configured to perform control in a manner that the command is executed by the second execution device detected by the device detection part.

15 Claims, 12 Drawing Sheets

FIG.4

| USER | DEVICE GROUP |
|---|---|
| FATHER | FIRST DEVICE GROUP (DEVICE GROUP 30A) |
| GRANDFATHER | SECOND DEVICE GROUP (DEVICE GROUP 30B) |
| ... | ... |

USER INFORMATION

FIG.5

| FIRST USER | SECOND USER | RELATIONSHIP |
|---|---|---|
| FATHER | GRANDFATHER | ACQUAINTANCES |
| ... | ... | ... |

RELATIONSHIP INFORMATION

FIG.6

| DEVICE GROUP | DEVICE | DEVICE TYPE | FUNCTION(S) |
|---|---|---|---|
| FIRST DEVICE GROUP (DEVICE GROUP 30A) | DEVICE 20A-1 | SMARTPHONE S1 | DLNA SERVER, STILL IMAGE SHOOTING, MOVING IMAGE SHOOTING, STILL IMAGE PLAYBACK, MOVING IMAGE PLAYBACK |
| FIRST DEVICE GROUP (DEVICE GROUP 30A) | DEVICE 20A-2 | TELEVISION DEVICE T1-1 | DLNA CLIENT, STILL IMAGE PLAYBACK, MOVING IMAGE PLAYBACK |
| SECOND DEVICE GROUP (DEVICE GROUP 30B) | DEVICE 20B-1 | RECORDING DEVICE R1 | DLNA SERVER, CONTENT RECORDING, DATA STORAGE |
| SECOND DEVICE GROUP (DEVICE GROUP 30B) | DEVICE 20B-2 | TELEVISION DEVICE T1-2 | DLNA CLIENT, STILL IMAGE PLAYBACK, MOVING IMAGE PLAYBACK |
| SECOND DEVICE GROUP (DEVICE GROUP 30B) | DEVICE 20B-3 | TELEVISION DEVICE T1-3 | DLNA CLIENT, STILL IMAGE PLAYBACK, MOVING IMAGE PLAYBACK |

DEVICE INFORMATION

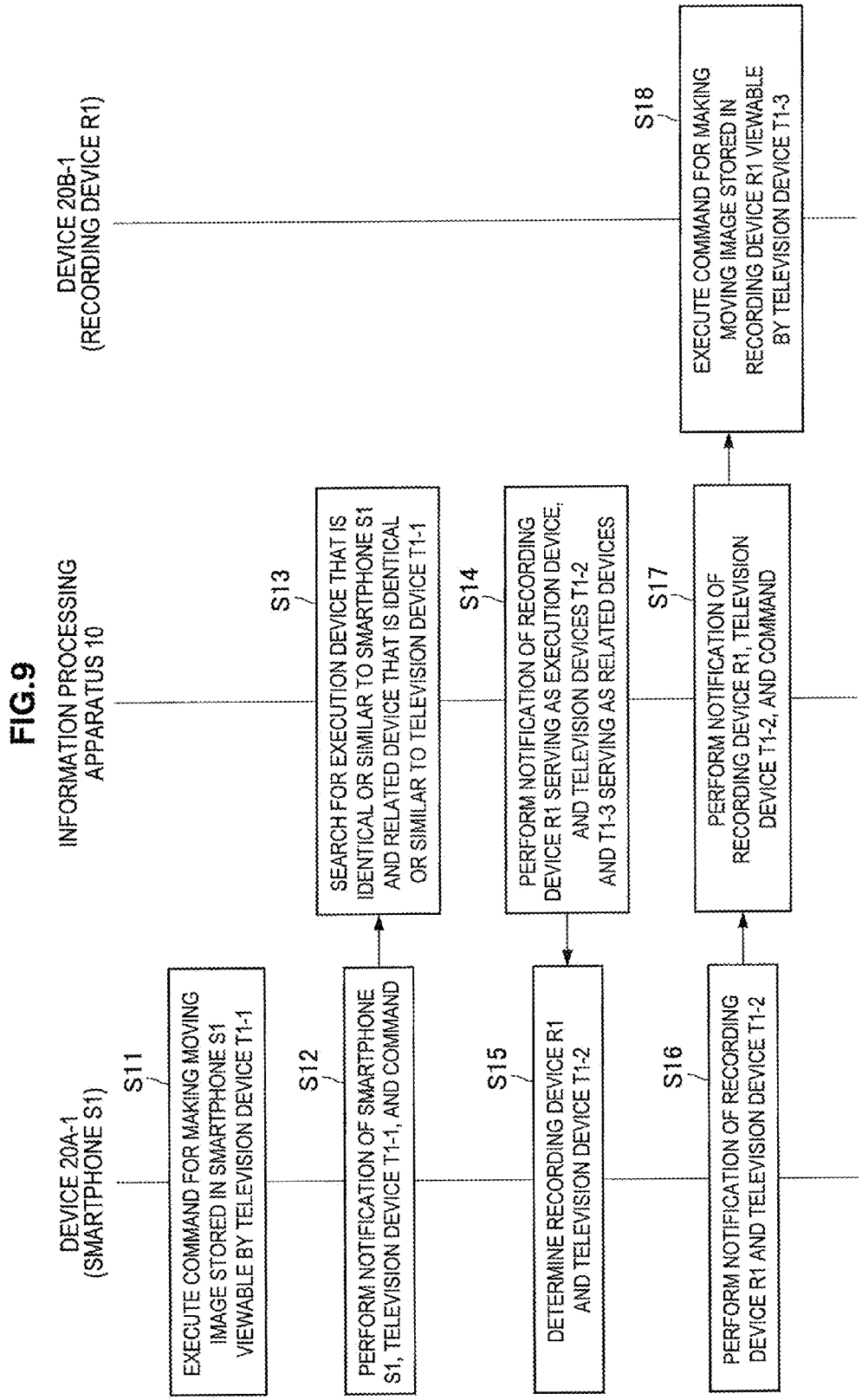

FIG.10

| DEVICE GROUP | DEVICE | DEVICE TYPE | FUNCTION(S) |
|---|---|---|---|
| FIRST DEVICE GROUP (DEVICE GROUP 30A) | DEVICE 20A-1 | RECORDING DEVICE R2-1 | DLNA SERVER, CONTENT RECORDING, DATA TRANSFER |
| FIRST DEVICE GROUP (DEVICE GROUP 30A) | DEVICE 20A-2 | SMARTPHONE S2-1 | DLNA CLIENT, DATA STORAGE, CONTENT PLAYBACK |
| SECOND DEVICE GROUP (DEVICE GROUP 30B) | DEVICE 20B-1 | RECORDING DEVICE R2-2 | DLNA SERVER, CONTENT RECORDING, DATA TRANSFER |
| SECOND DEVICE GROUP (DEVICE GROUP 30B) | DEVICE 20B-2 | SMARTPHONE S2-2 | DLNA CLIENT, DATA STORAGE, CONTENT PLAYBACK |
| SECOND DEVICE GROUP (DEVICE GROUP 30B) | DEVICE 20B-3 | MOBILE PHONE M1 | DLNA CLIENT, DATA STORAGE |

DEVICE INFORMATION

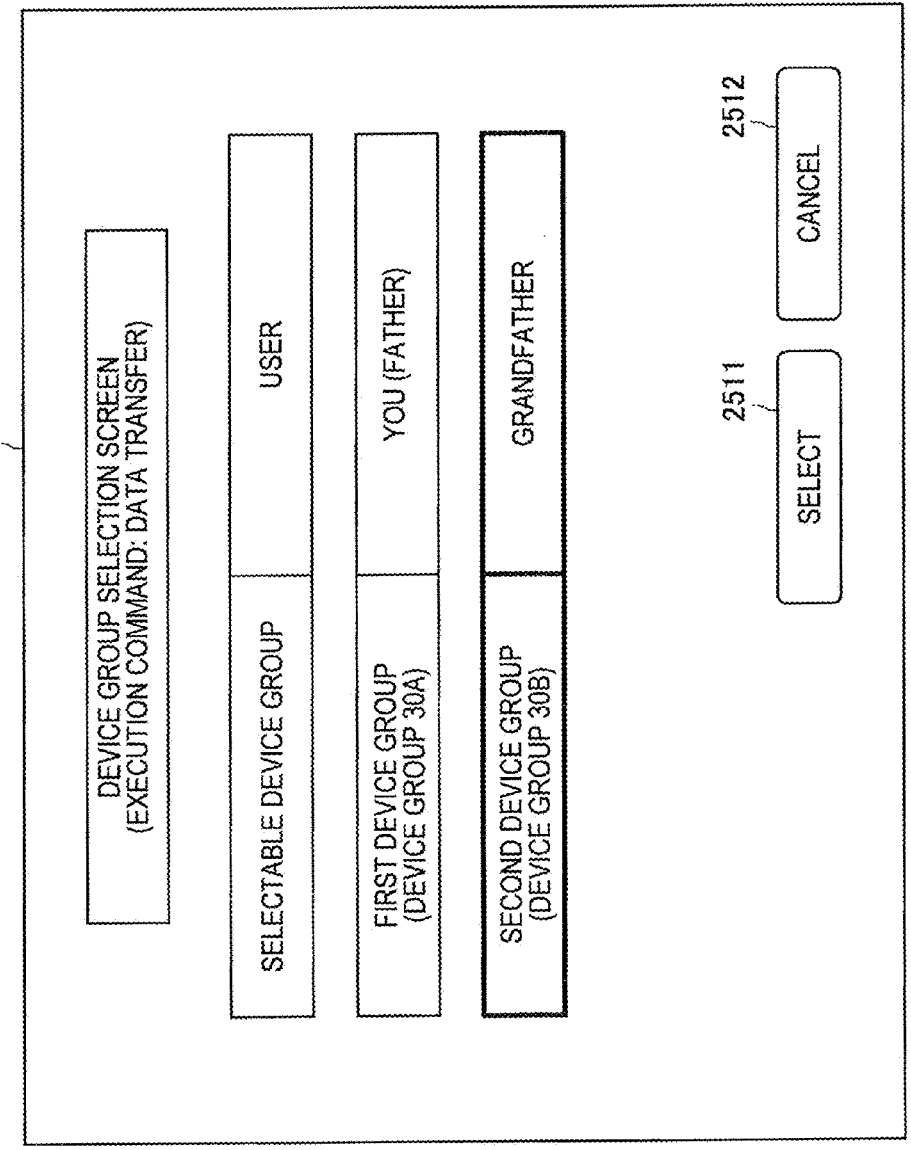

INFORMATION PROCESSING APPARATUS, INFORMATION PROCESSING METHOD, AND PROGRAM

CROSS REFERENCES TO RELATED APPLICATIONS

This application is a continuation of and claims the benefit under 35 U.S.C. §120 of U.S. patent application Ser. No. 13/779,171, titled "INFORMATION PROCESSING APPARATUS, INFORMATION PROCESSING METHOD, AND PROGRAM," filed on Feb. 27, 2013, which claims the benefit under 35 U.S.C. §119 of Japanese Patent Application JP 2012-067035, filed on Mar. 23, 2012, each of which is hereby incorporated by reference in its entirety.

BACKGROUND

The present disclosure relates to an information processing apparatus, an information processing method, and a program.

In recent years, with the developments in information communication technology, various types of devices have been in widespread use in homes and offices. The functions that each device has may differ depending on the type of the device, for example, and hence, various technologies are disclosed for a user to easily grasp functions of a device. For example, technology is disclosed for a user to easily grasp functions that are provided from a combination of multiple devices (for example, see JP 2011-253370A).

The functions provided by a device are realized by the device executing a command. In the case of causing a certain device to execute a command, there is a demand that a command that is identical to this command be executed by another device. The command may be a command which was executed in the past, may be a command which is being executed at the present moment, or may be a command which will be executed in future, by a certain device.

SUMMARY

However, with only grasping the functions of the device in order to satisfy the demand, the burden is imposed on the user, for determining whether it is possible to cause a command, which is identical to a command to be executed by a certain device, to be easily executed by another device. Further, it is necessary that the user performs operation for causing another device to execute the command.

In light of the foregoing, it is desirable to provide technology for causing a command, which is identical to a command to be executed by a certain device, to be easily executed by another device.

According to an embodiment of the present disclosure, there is provided an information processing apparatus which includes a device detection part configured to detect a second execution device that is identical or similar to a first execution device which executes a command, and an execution control part configured to perform control in a manner that the command is executed by the second execution device detected by the device detection part.

According to another embodiment of the present disclosure, there is provided an information processing method which includes detecting a second execution device that is identical or similar to a first execution device which executes a command, and performing control in a manner that the command is executed by the second execution device.

According to another embodiment of the present disclosure, there is provided a program for causing a computer to function as an information processing apparatus including a device detection part configured to detect a second execution device that is identical or similar to a first execution device which executes a command, and an execution control part configured to perform control in a manner that the command is executed by the second execution device detected by the device detection part.

According to the embodiments of the present disclosure described above, there can be provided technology for causing a command, which is identical to a command to be executed by a certain device, to be easily executed by another device.

BRIEF DESCRIPTION OF THE DRAWINGS

FIG. 4 is a diagram showing a structure example of user information;

FIG. 5 is a diagram showing a structure example of relationship information;

FIG. 6 is a diagram showing a structure example of device information according to a first example;

FIG. 9 is a flowchart showing operation of an information processing system according to the first example;

FIG. 10 is a diagram showing a structure example of device information according to a second example;

FIG. 11 is a diagram showing a device group selection screen according to the second example;

DETAILED DESCRIPTION OF THE EMBODIMENT(S)

Figure 1:
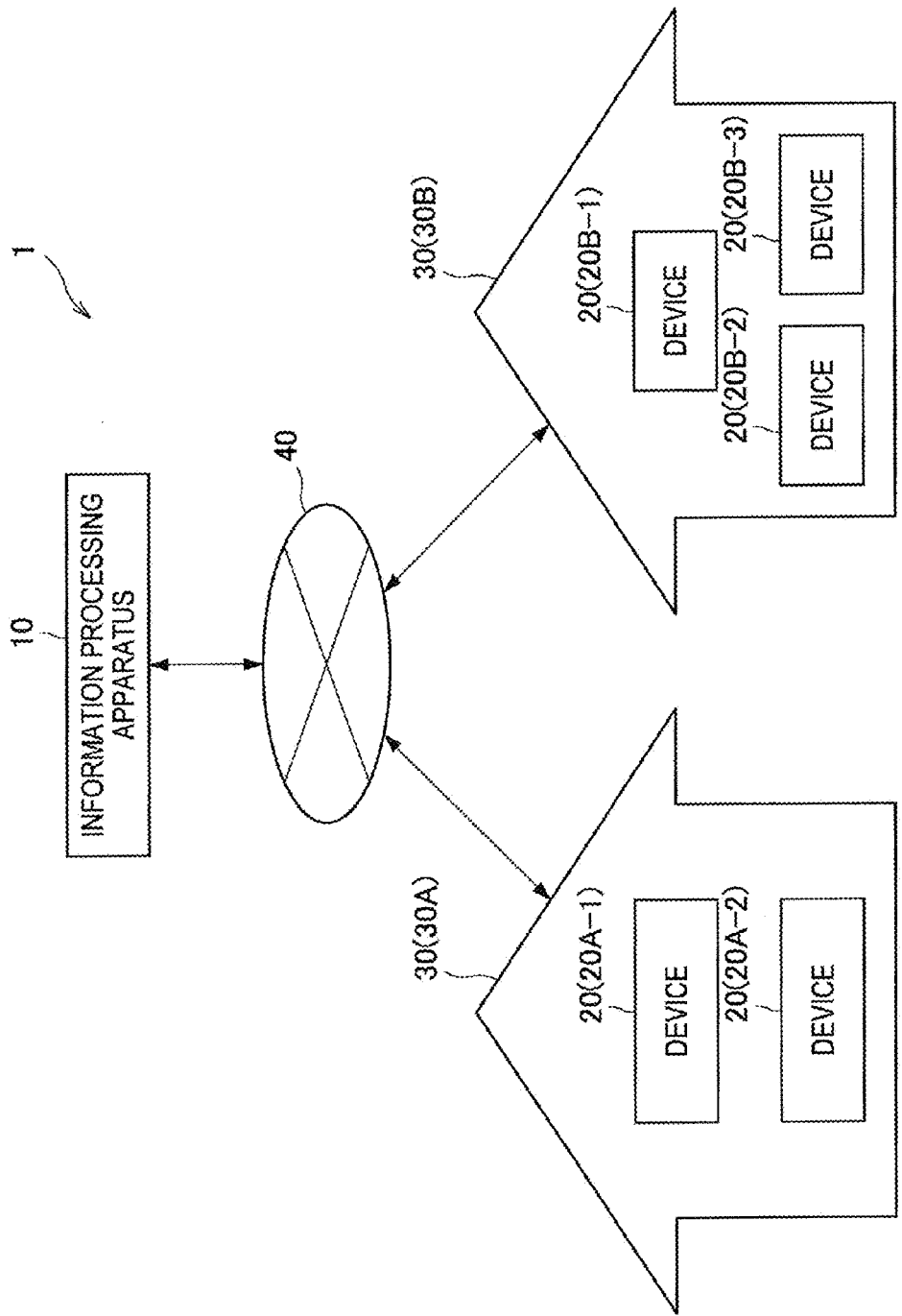
FIG. 1 is a diagram showing a configuration example of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets after the same reference numeral. Note that, in the case where it is not necessary to distinguish the multiple structural elements that have substantially the same function and structure from one another, the multiple structural elements are denoted with the same reference numeral only.

Further, the "detailed description of the embodiment(s)" will be described in the following order.

1. Embodiment
   1-1. Configuration example of information processing system
   1-2. Functional configuration example of information processing apparatus
   1-3. Functional configuration example of device
   1-4. Function of information processing system (first example)
   1-5. Operation of information processing system (first example)
   1-6. Function of information processing system (second example)
   1-7. Operation of information processing system (second example)
2. Conclusion

<<1. EMBODIMENT>>

An embodiment of the present disclosure will be sequentially described in detail.

<1-1. Configuration Example of Information Processing System>

First, a configuration example of an information processing system 1 according to an embodiment of the present disclosure will be described. FIG. 1 is a diagram showing a configuration example of the information processing system 1 according to an embodiment of the present disclosure.

As shown in FIG. 1, the information processing system 1 according to the embodiment of the present disclosure includes, for example, an information processing apparatus 10, a device group 30A, and a device group 30B. The information processing apparatus 10, the device group 30A, and the device group 30B are each connected to a network 40, and are communicable with each other through the network 40. For example, the device group 30A corresponds to a first device group, and the device group 30B corresponds to a second device group.

Note that, in FIG. 1, although two device groups 30 (device group 30A and device group 30B) are connected to the network 40, three or more device groups 30 may be connected to the network 40. Alternatively, the number of device groups 30 may be one. In this case, the first device group and the second device group may be a single device group 30.

The device group 30A includes a device 20A-1 and a device 20A-2. However, the number of devices 20 included in the device group 30A is not particularly limited. For example, the number of devices 20 included in the device group 30A may be one, or two or more. Further, in the example shown in FIG. 1, although the device group 30A is present inside a home, the environment in which the device group 30A is present is not particularly limited. For example, the device group 30A may be present inside an office. The type of the device 20 included in the device group 30A is not particularly limited.

The devices 20 included in the device group 30A may be communicable with each other through a local area network (LAN) such as a home network, or may be communicable with each other through a leased line. Note that, in the embodiment of the present disclosure, although the case is assumed where the device group 30A is used by Father, by whom the device group 30A is used is not particularly limited, and the device group 30A may not be used by a specific person.

The device group 30B includes a device 20B-1, a device 20B-2, and a device 20B-3. However, the number of devices 20 included in the device group 30B is not particularly limited. For example, the number of devices 20 included in the device group 30B may be one, or two or more. Further, in the example shown in FIG. 1, the device group 30B is present inside a home, the environment in which the device group 30B is present is not particularly limited. For example, the device group 30B may be present inside an office. The type of the device 20 included in the device group 30B is not particularly limited.

The devices 20 included in the device group 30B may be communicable with each other through a LAN such as a home network, or may be communicable with each other through a leased line. Note that, in the embodiment of the present disclosure, although the case is assumed where the device group 30B is used by Grandfather, by whom the device group 30B is used is not particularly limited, and the device group 30B may not be used by a specific person.

The configuration of the information processing system 1 shown in FIG. 1 is merely an example. For example, as shown in FIG. 1, the information processing apparatus 10 may be provided separately from all devices 20, or may be built in any one of the devices 20. Further, a part of the functions of the information processing apparatus 10 may be included in any one of the devices 20. The network 40 may be the Internet, a wireless LAN, or another network.

Here, the functions provided by the device 20 are realized by the device 20 executing a command. For example, in the case of causing the device 20A-1 to execute a command, there is a demand that a command that is identical to this command be executed by another device (device 20A-2, device 20B-1, device 20B-2, or device 20B-3). The command may be a command which was executed in the past, may be a command which is being executed at the present moment, or may be a command which will be executed in future, by the device 20A-1.

In order to satisfy the demand, in an embodiment of the present disclosure, there is suggested technology for causing the command, which is identical to the command to be executed by the device 20A-1, to be easily executed by another device (device 20A-2, device 20B-1, device 20B-2, or device 20B-3).

Heretofore, the configuration example of the information processing system 1 according to an embodiment of the present disclosure has been described. Next, a functional configuration example of the information processing apparatus 10 according to an embodiment of the present disclosure will be described.

<1-2. Functional Configuration Example of Information Processing Apparatus>

Figure 2:
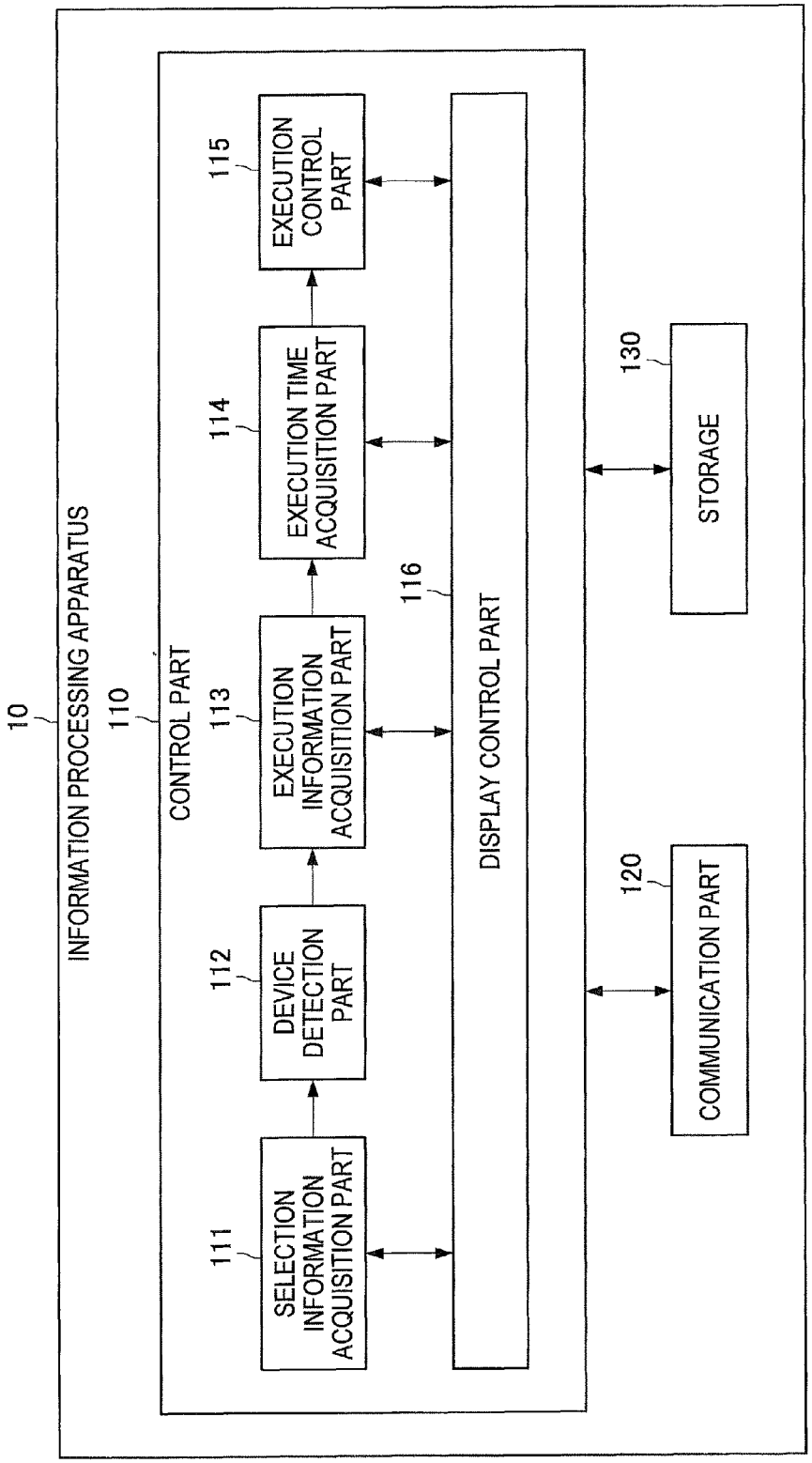
FIG. 2 is a diagram showing a functional configuration example of an information processing apparatus according to an embodiment of the present disclosure.

FIG. 2 is a diagram showing a functional configuration example of the information processing apparatus 10 according to an embodiment of the present disclosure. As shown in FIG. 2, the information processing apparatus 10 includes a control part 110, a communication part 120, and a storage 130. Further, the control part 110 includes a selection information acquisition part 111, a device detection part 112, an execution information acquisition part 113, an execution time acquisition part 114, an execution control part 115, and a display control part 116.

The control part 110 corresponds to a processor such as a central processing unit (CPU), for example. The control part 110 exhibits various functions that the control part 110 has, by executing programs stored in the storage 130 or another storage medium. The respective functions of the selection information acquisition part 111, the device detection part 112, the execution information acquisition part 113, the execution time acquisition part 114, the execution control part 115, and the display control part 116 are realized by executing programs. The respective functions thereof will be described later.

The communication part 120 is a communication interface configured from, for example, a communication device for connecting to a network 40 via wire or radio. The communication part 120 is capable of communicating with a device 20 included in the device group 30A through the network 40, for example. Further, the communication part 120 is capable of communicating with a device 20 included in the device group 30B through the network 40, for example.

The storage 130 stores a program for operating the control part 110 and data using a storage medium such as a semiconductor memory or a hard disk. Further, for example, the storage 130 can also store setting information used by the program. In the example shown in FIG. 2, although the storage 130 is built in the information processing apparatus 10, the storage 130 may also be present outside the information processing apparatus 10.

Heretofore, the functional configuration example of the information processing apparatus 10 according to an embodiment of the present disclosure has been described. Next, a functional configuration example of the device 20 according to an embodiment of the present disclosure will be described.

<1-3. Functional Configuration Example of Device>

Figure 3:
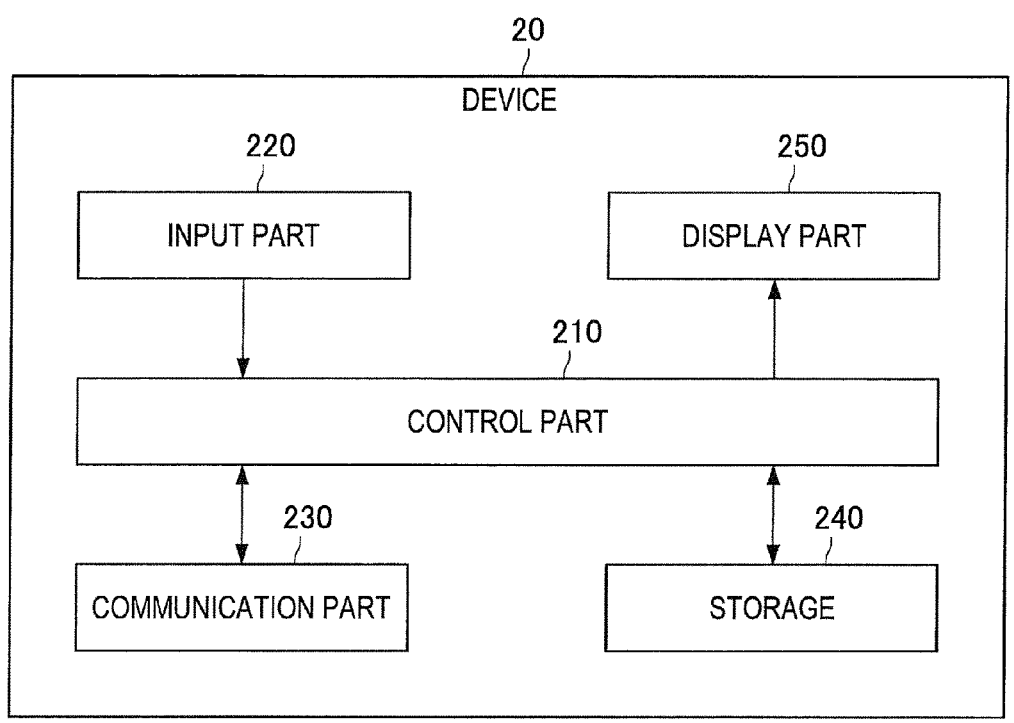
FIG. 3 is a diagram showing a functional configuration example of a device according to an embodiment of the present disclosure.

FIG. 3 is a diagram showing a functional configuration example of the device 20 according to an embodiment of the present disclosure. As shown in FIG. 3, the device 20 includes a control part 210, an input part 220, a communication part 230, a storage 240, and a display part 250. Note that the display part 250 is included in the device 20 in the case where the device 20 has a display function, and may not be included in the device 20 in the case where the device 20 does not have a display function.

The control part 210 corresponds to a processor such as a CPU, for example. The control part 210 exhibits various functions that the control part 210 has, by executing programs stored in the storage 240 or another storage medium. The functions of the control part 210 will be described later.

The input part 220 has a function of accepting operation from a user. The input part 220 outputs the operation from the user as operation information to the control part 210. The operation information is used by the control part 210, for executing programs, for example. In the example shown in FIG. 3, although the input part 220 is built in the device 20, the input part 220 may also be present outside the device 20.

The communication part 230 is a communication interface configured from, for example, a communication device. The communication part 230 is capable of communicating with another device 20 included in the device group to which the relevant device 20 belongs, for example. Further, the communication part 230 may be capable of communicating with the information processing apparatus 10 through the network 40, for example. Further, the communication part 230 may be capable of communicating with a device group that is different from the device group to which the relevant device 20 belongs.

The storage 240 stores a program for operating the control part 210 and data using a storage medium such as a semiconductor memory or a hard disk. Further, for example, the storage 240 can also store setting information used by the program. In the example shown in FIG. 3, although the storage 240 is built in the device 20, the storage 240 may also be present outside the device 20.

The display part 250 has a function of displaying various types of information in accordance with control performed by the control part 210. For example, the display part 250 may have a function of displaying various types of screens in accordance with control performed by the control part 210. Further, the display part 250 may have a function of displaying a result obtained by executing a program by the control part 210. In the example shown in FIG. 3, although the display part 250 is built in the device 20, the display part 250 may also be present outside the device 20.

Heretofore, the functional configuration example of the information processing apparatus 10 according to an embodiment of the present disclosure has been described. Next, details of the information processing system 1 according to an embodiment of the present disclosure will be described. Hereinafter, description will be made on the case where the device group 30A is used by Father and the device group 30B is used by Grandfather. First, functions of an information processing system 1 according to a first example will be described.

<1-4. Function of Information Processing System (First Example)>

The scene which is assumed in a first example is as follows. First, let us assume the case where Father performs digital living network alliance (DLNA) connection setup using the device group 30A. Under the circumstances, Grandfather also attempts to perform DLNA connection setup using the device group 30B, but Grandfather, who is a user of the device group 30B, is not very familiar with operation of devices.

In this case, when a command that is identical to a command (DLNA connection setup) executed in the device group 30A is also executed in the device group 30B, it is not necessary to have Grandfather operate the device group 30B, and neither does Father have to operate the device group 30B in order to execute the command. In the first example, let us assume the case where a command that is identical to the command (DLNA connection setup) executed in the device group 30A is also executed in the device group 30B.

First, there will be described structures of various types of information used by the control part 110 of the information processing apparatus 10 according to the first example. FIG. 4 is a diagram showing a structure example of user information. As shown in FIG. 4, the user information is information in which a user and a device group 30 are associated with each other. For example, in the example shown in FIG. 4, Father is associated with a first device group (device group 30A), and Grandfather is associated with a second device group (device group 30B). As the example shown in FIG. 4, the description will be continued assuming that a user is associated with each device group 30, but a user may not be associated with each device group 30.

Note that, for example, the user information is stored in advance in the storage 130 of the information processing apparatus 10. Further, for example, when information in which a user and a device group 30 are associated with each other is transmitted from a device 20 to the information processing apparatus 10, the relevant transmitted information is added to the user information. The user information stored in the storage 130 is appropriately used by the control part 110 of the information processing apparatus 10.

FIG. 5 is a diagram showing a structure example of relationship information. As shown in FIG. 5, the relationship information is information in which a first user, a second user, and a relationship are associated with each other. For example, in the example shown in FIG. 5, Father, Grandfather, and a relationship (acquaintances) are associated with each other. As the example shown in FIG. 5, the description will be continued assuming that a first user, a second user, and a relationship are associated with each other, but the relationship information may not be particularly provided.

Note that, for example, the relationship information is stored in advance in the storage 130 of the information processing apparatus 10. Further, for example, when information in which a first user, a second user, and a relationship are associated with each other is transmitted from a device 20 to the information processing apparatus 10, the relevant transmitted information is added to the relationship information. The relationship information stored in the storage 130 is appropriately used by the control part 110 of the information processing apparatus 10.

FIG. 6 is a diagram showing a structure example of device information according to the first example. As shown in FIG. 6, the device information is information in which a device group, a device, a device type, and function(s) are associated with each other. For example, in the example shown in FIG. 6, a first device group (device group 30A), a device 20A-1, a device type (smartphone S1), and functions (DLNA server, still image shooting, moving image shooting, still image playback, and moving image playback) are associated with each other. As the example shown in FIG. 6, the description will be continued assuming that a device group, a device, a device type, and function(s) are associated with each other, but the device type, for example, may not particularly be provided.

Note that, for example, the device information is stored in advance in the storage 130 of the information processing apparatus 10. Further, for example, when information in which a device group, a device, a device type, and function(s) are associated with each other is transmitted from a device 20 to the information processing apparatus 10, the relevant transmitted information is added to the device information. The device information stored in the storage 130 is appropriately used by the control part 110 of the information processing apparatus 10.

The device type corresponds to a model number of a device, for example. Accordingly, for example, the function(s) included in the device information may be easily acquired based on the device type. In this case, even if the function(s) of the device are not transmitted from the device 20 to the information processing apparatus 10, the control part 110 of the information processing apparatus 10 is capable of acquiring the function(s) of the device based on the device type.

Heretofore, there have been described the structures of various types of information used by the control part 110 of the information processing apparatus 10 according to the first example. Next, details of functions of the control part 110 according to the first example will be described.

First, let us assume that Father, who is a user of a device group 30A, executes a command (DLNA connection setup) using the device group 30A. For example, let us assume that Father causes a device 20A-1 (first execution device) to execute the command. Let us assume that, as a result of executing the command, a moving image stored in the device 20A-1 can be viewed by a device 20A-2. Note that, in the example shown in FIG. 6, the type of the device 20A-1 is a smartphone S1, and the type of the device 20A-2 is a television device T1-1.

Further, although an example is assumed here in which a command has already been executed by the device 20A-1, examples are not limited thereto. For example, the command executed by the device 20A-1 may be a command which has already been executed by the device 20A-1, may be a command which is being executed by the device 20A-1 at the present moment, or may be a command which will be executed by the device 20A-1 in future. That the command is executed by the device 20A-1 may be stored in the storage 240, for example.

Figure 7:
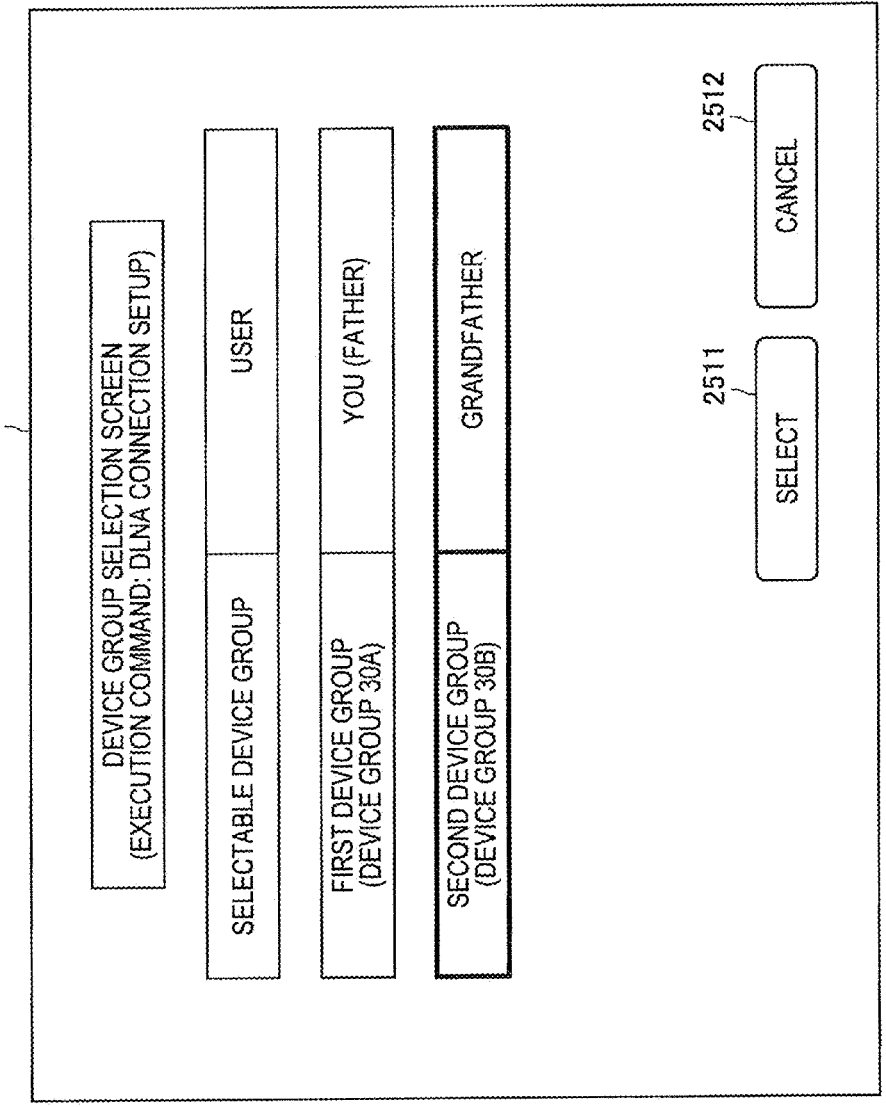
FIG. 7 is a diagram showing a device group selection screen according to the first example.

For example, when the command is executed by the device 20A-1, a device group selection screen 251 is displayed on the display part 250 of the device 20A-1. FIG. 7 is a diagram showing a device group selection screen 251 according to the first example. Here, when Father performs operation of selecting the second device group (device group 30B) of Grandfather in the device group selection screen 251, the selection information acquisition part 111 acquires selection information for selecting the second device group. For example, the operation of selecting a device group may be completed by selecting a "select" button 2511. Note that, Father may select the first device group (device group 30A) whose user is Father himself, using the device group selection screen 251. Further, the operation of selecting a device group may not be performed. In this case, the operation of cancelling the selection of a device group may be completed by selecting a "cancel" button 2512, for example.

Next, the device detection part 112 detects a device 20 that is identical or similar to the device 20A-1. For example, the device detection part 112 detects a device 20 that is identical or similar to the device 20A-1 included in the first device group (device group 30A) from the second device group (device group 30B). For example, in the case where the selection information acquisition part 111 acquires selection information for selecting the second device group (device group 30B), the device detection part 112 detects a device 20 that is identical or similar to the device 20A-1 from the second device group (device group 30B) selected based on the selection information.

Here, the range of "identical" may be determined in advance. For example, the device detection part 112 may detect a device 20 belonging to a type identical to the type of the device 20A-1 as a device 20 that is identical to the device 20A-1. Further, the device detection part 112 may also detect a device 20 having a function identical to the function of the device 20A-1 as a device 20 that is identical to the device 20A-1.

Further, the range of "similar" may also be determined in advance. For example, in the case where there is a device 20 belonging to a type similar to the type of the device 20A-1, the device detection part 112 may detect the device 20 as a device 20 that is similar to the device 20A-1. The similarity range of a type of a device may also be determined in advance. Further, the device detection part 112 may detect a device 20 having a function identical to the function of the device 20A-1 as a device 20 that is similar to the device 20A-1.

Figure 8:
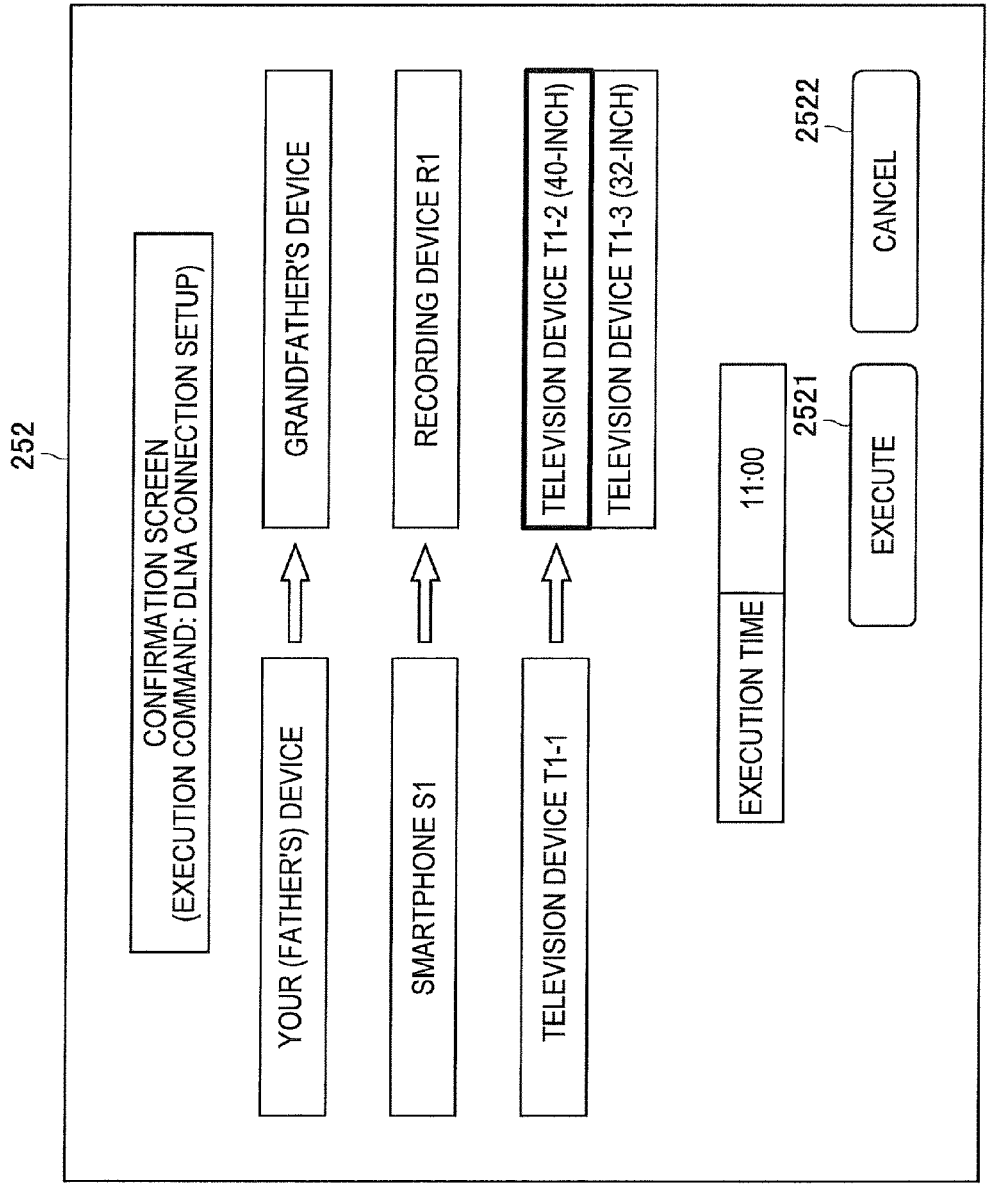
FIG. 8 is a diagram showing a confirmation screen according to the first example.

In the example shown in FIG. 6, the device 20B-1 (second execution device) having a function identical to the function (DLNA server) of the device 20A-1 is detected as a device 20 that is similar to the device 20A-1. Note that, in the example shown in FIG. 6, the type of the device 20B-1 is a recording device R1. For example, when the device 20B-1 is detected by the device detection part 112, a confirmation screen 252 is displayed on the display part 250 of the device 20A-1. FIG. 8 is a diagram showing the confirmation screen 252 according to the first example.

The display control part 116 may perform control in a manner that the type (recording device R1) of the device 20B-1 detected by the device detection part 112 is displayed. For example, the display control part 116 may control the display part 250 in a manner that the type of the device 20B-1 is displayed on the display part 250 of the device 20A-1. In this way, when the type of the device 20B-1 detected by the device detection part 112 is displayed, Father can confirm the detected device 20.

Here, the number of devices 20 that is identical or similar to the device 20A-1 may not be one. Accordingly, for example, in the case where there are one or multiple devices 20 that are identical or similar to the device 20A-1, the device detection part 112 determines a device 20 from the one or multiple devices 20. Various techniques are assumed as a technique for determining a device 20 from the one or multiple devices 20.

For example, the device detection part 112 may determine a device 20 from the one or multiple devices 20, based on operation information input by Father. Further, for example, the device detection part 112 may determine a device 20 from the one or multiple devices 20, based on setting information that is set in advance. Further, the device detection part 112 may determine a device 20 from the one or multiple devices 20, based on a usage status of each of the one or multiple devices 20.

The usage status may be a usage frequency or may be a usage time period. That is, the device detection part 112 may determine a device 20 from the one or multiple devices 20 based on a usage frequency or a usage time period of each of the one or multiple devices 20. For example, the device detection part 112 may determine the device 20 with the highest usage frequency. This is because it is considered that Grandfather more frequently uses a device 20 with a higher usage frequency. The usage frequency may be the number of starts of a device 20. Further, for example, the device detection part 112 may determine the device 20 with the longest usage time period. This is because it is considered that Grandfather more frequently uses a device 20 with a longer usage time period.

Further, the usage time period of a device 20 may be a time period during which the power of the device 20 is on, or may be a movement distance of the device 20. For example, in the case where there is provided a function of estimating a position of the device 20, the movement distance of the device 20 may be calculated based on a history of position information acquired by the function. Accordingly, for example, the device detection part 112 may determine the device 20 with the greatest movement distance. This is because it is considered that Grandfather more frequently uses a device 20 with a greater movement distance.

Further, the usage status may also be an available space in a storage area. That is, in the case where the one or multiple devices 20 each have a storage area, the device detection part 112 may determine a device 20 from the one or multiple devices 20 based on an available space in the storage area of each of the one or multiple devices 20. For example, the device detection part 112 may determine the device 20 having the largest available space in the storage area. This is because it is considered that more storage area can be used for command execution when there is a larger available space in the storage area.

Heretofore, although examples have been described in which the device detection part 112 detects a device 20 that is identical or similar to a device 20 which executes a command, the device detection part 112 may also detect a device 20 that is identical or similar to a device 20 which is related to a command. For example, in the case where the above-mentioned DLNA connection setup is the command, the device 20A-2 (television device T1-1) is related to the command. Accordingly, the device detection part 112 may detect a device 20 that is identical or similar to the device 20A-2 (first related device). The range of "identical" and the range of "similar" may be determined in the same manner as the range of "identical" or "similar" with respect to the device 20A-1.

In the example shown in FIG. 6, the device 20B-2 (second related device), which has a function identical to a function (DLNA client) of the device 20A-2, is detected as a device 20 that is similar to the device 20A-2. Note that, in the example shown in FIG. 6, the type of the device 20B-2 is a television device T1-2. For example, when the device 20B-2 is detected by the device detection part 112, as shown in the confirmation screen 252, the display control part 116 may perform control in a manner that the type (television device T1-2) of the device 20B-2 detected by the device detection part 112 is displayed.

The device detection part 112 may detect any device 20 as a device 20 that is identical or similar to the device 20A-2. For example, the device detection part 112 may detect a device 20 usable by the device 20A-2. This is because even if a device 20 unusable by the device 20A-2 is detected, the device 20 may not take part in execution of a command.

Further, for example, the device detection part 112 may detect a device 20 connectable to the device 20A-2. This is because even if a device 20 that is not connectable to the device 20A-2 is detected, the communication between the device 20 and the device 20A-2 may not be performed normally. Alternatively, the device detection part 112 may detect a device 20 which supports a protocol that is identical to the protocol which the device 20A-2 supports. This is because even if a device 20 supporting a protocol different from the protocol which the device 20A-2 supports is detected, cooperation between the device 20 and the device 20A-2 may not be performed normally.

In the example shown in FIG. 6, the device 20B-2 and the device 20B-3, each having a function identical to a function (DLNA client) of the device 20A-2, are detected as devices 20 that are similar to the device 20A-2. Note that, in the example shown in FIG. 6, the type of the device 20B-2 is the television device T1-2. Further, the type of the device 20B-3 is a television device T1-3.

The display control part 116 may perform control in a manner that the type (television device T1-2) of the device 20B-2 detected by the device detection part 112 and the type (television device T1-3) of the device 20B-3 detected by the device detection part 112 are displayed. For example, the display control part 116 may control the display part 250 in a manner that the type of the device 20B-2 and the type of the device 20B-3 are displayed on the display part 250 of the device 20A-1. In this way, when the type of the device 20B-2 detected by the device detection part 112 and the type of the device 20B-3 detected by the device detection part 112 are displayed, Father can confirm the detected device 20.

Here, the number of devices 20 that is identical or similar to the device 20A-2 may not be one. Accordingly, for example, in the case where there are one or multiple devices 20 that are identical or similar to the device 20A-2, the device detection part 112 determines a device 20 from the one or multiple devices 20. As a technique for determining a device 20 from the one or multiple devices 20, the same technique can be adopted as the technique used for determining a device 20 from the one or multiple devices 20 that are identical or similar to the device 20A-1.

For example, as shown in the confirmation screen 252, the display control part 116 may perform control in a manner that the type (television device T1-2) of the device 20B-2 detected by the device detection part 112 and the type (television device T1-3) of the device 20B-3 detected by the device detection part 112 are displayed. Here, for example, Father can perform operation of selecting the device 20B-2 (television device T1-2) or the device 20B-3 (television device T1-3) on the confirmation screen 252.

Next, the execution information acquisition part 113 acquires execution information indicating whether a command is to be executed by the device 20B-1. For example, when Father performs operation for causing the command to be executed, the execution information indicating that the command is to be executed is acquired by the execution information acquisition part 113. For example, the operation for causing the command to be executed is completed by selecting an "execute" button 2521. Further, the operation for causing the command to be executed may not be performed. In this case, the operation of cancelling the command execution is completed by selecting a "cancel" button 2522.

Here, the execution time acquisition part 114 may also acquire an execution time at which a command is to be executed by the device 20B-1. For example, when Father performs operation of inputting an execution time using the device 20A-1, the execution time is acquired by the execution time acquisition part 114. For example, as the example shown in FIG. 8, the execution time can be input on the confirmation screen 252. Note that the execution time may not particularly be input. In this case, the timing at which the command is executed by the device 20B-1 is not particularly limited.

The execution control part 115 performs control in a manner that a command is executed by the device 20B-1 detected by the device detection part 112. For example, the execution control part 115 may control the device 20B-1 in a manner that the execution of the command (DLNA connection setup) is performed by the device 20B-1. Further, in the case where execution information indicates that a command is to be executed by the device 20B-1, the execution control part 115 may control the device 20B-1 in a manner that the command is executed by the device 20B-1. For example, the execution control part 115 may perform control in a manner that the device 20B-1 detected by the device detection part 112 is notified of the command. The notification of the command may be performed by the communication part 120, or may be performed by the device 20A-1.

Further, in the case where the an execution time is acquired by the execution time acquisition part 114, the execution control part 115 may control the device 20B-1 in a manner that a command is executed at the execution time by the device 20B-1. Further, in the case where the device 20B-2 related to a command is detected by the device detection part 112, the execution control part 115 performs control in a manner that the device 20B-2 relates to the execution of the command performed by the device 20B-1. For example, the device 20B-2 may be controlled in a manner that the command (DLNA connection setup) that makes a moving image stored in the device 20B-1 viewable by the device 20B-2 is executed.

As described above, according to the first example, the command that is identical to the command (DLNA connection setup) executed in the device group 30A is also executed in the device group 30B. Accordingly, in order to execute the command, it is not necessary to have Grandfather operate the device group 30B, and neither does Father have to operate the device group 30B. Therefore, for example, a command that is identical to a command to be executed by the device 20A-1 can be easily executed by the device 20B-1.

Heretofore, functions of the information processing system 1 according to the first example have been described. Hereinafter, operation of the information processing system 1 according to the first example will be described.

<1-5. Operation of Information Processing System (First Example)>

FIG. 9 is a flowchart showing operation of the information processing system 1 according to the first example. Note that, since the operation shown in FIG. 9 is merely an example of the information processing system 1 in the first example, operation of an information processing system 1 according to an embodiment of the present disclosure is not limited to the operation shown in FIG. 9. Further, in the example shown in FIG. 9, a device 20 is specified by the type of the device 20.

As shown in FIG. 9, first, the control part 210 of the smartphone S1 executes a command for making a moving image stored in the smartphone S1 viewable by the television device T1-1 (S11). The command corresponds to the above-mentioned DLNA connection setup, and the smartphone S1 corresponds to the type of the first execution device. Next, the communication part 230 of the smartphone S1 notifies the information processing apparatus 10 of the smartphone S1, the television device T1-1, and the command (S12). The television device T1-1 corresponds to the type of the first related device.

Next, the device detection part 112 of the information processing apparatus 10 searches for an execution device that is identical or similar to the smartphone S1 and a related device that is identical or similar to the television device T1-1 (S13). For example, in the case where selection information for selecting the device group 30B is acquired by the selection information acquisition part 111, the searching for the execution device and the related device is performed from the device group 30B. Here, let us assume that the recording device R1 is detected as the execution device that is identical or similar to the smartphone S1, and the television device T1-2 and the television device T1-3 are detected as related devices that are identical or similar to the television device T1-1.

Next, the communication part 120 of the information processing apparatus 10 notifies the smartphone S1 of the recording device R1 serving as the execution device and the television device T1-2 and the television device T1-3, each serving as the related device (S14). Note that, in the case where the device detection part 112 has a function of detecting one related device from multiple related devices, the notification of the recording device R1, the television device T1-2, and the television device T1-3 to the smartphone S1 may not be performed.

Next, the control part 210 of the smartphone S1 determines the recording device R1 serving as the second execution device and the television device T1-2 serving as the second related device based on operation accepted by the input part 220 (S15). The communication part 230 of the smartphone S1 notifies the information processing apparatus 10 of the recording device R1 and the television device T1-2 (S16). Note that, in the example shown in FIG. 9, although the communication part 230 of the smartphone S1 notifies the information processing apparatus 10 of the recording device R1 and the television device T1-2, the communication part 230 of the smartphone S1 may notify the recording device R1, without through the information processing apparatus 10, of the recording device R1 and the television device T1-2. In this case, the communication part 230 of the smartphone S1 may also notify the recording device R1, without through the information processing apparatus 10, of the command.

Next, the communication part 120 of the information processing apparatus 10 notifies the recording device R1 of the recording device R1, the television device T1-2, and the command (S17). The control part 210 of the recording device R1 executes the command for making a moving image stored in the recording device R1 viewable by the television device T1-3 (S18). In this way, according to the first example, the command that is identical to the command (DLNA connection setup) executed in the device group 30A is also executed in the device group 30B.

Heretofore, operation of the information processing system 1 according to the first example has been described. Hereinafter, functions of an information processing system 1 according to a second example will be described.

<1-6. Function of Information Processing System (Second Example)>

The scene which is assumed in a second example is as follows. First, let us assume the case where Father transfers content to a portable device using the device group 30A and views the content while travelling using the device, and as a result thereof, Father wants to let Grandfather view the content while travelling.

In this case, when a command that is identical to a command (data transfer) executed in the device group 30A is also executed in the device group 30B, it is not necessary to have Grandfather operate the device group 30B, and neither does Father have to operate the device group 30B in order to execute the command. In the second example, let us assume the case where a command that is identical to the command (data transfer) executed in the device group 30A is also executed in the device group 30B.

First, there will be described structures of various types of information used by the control part 110 of the information processing apparatus 10 according to the second example. In the second example, the case is assumed where the structure example of user information is the same as the structure example of the user information shown in FIG. 4. Further, in the second example, the case is assumed where the structure example of relationship information is the same as the structure example of the relationship information shown in FIG. 5.

FIG. 10 is a diagram showing a structure example of device information according to the second example. For example, in the example shown in FIG. 10, a first device group (device group 30A), a device 20A-1, and a device type (recording device R2-1), and functions (DLNA server, content recording, and data transfer) are associated with each other. In the same manner as in the example shown in FIG. 6, the device type may not particularly be provided, for example.

Heretofore, there have been described the structures of various types of information used by the control part 110 of the information processing apparatus 10 according to the second example. Next, details of functions of the control part 110 according to the second example will be described.

First, let us assume that Father, who is a user of a device group 30A, executes a command (data transfer) using the device group 30A. For example, let us assume that Father causes a device 20A-1 (first execution device) to execute the command. Let us assume that, as a result of executing the command, content C1 stored in the device 20A-1 can be transferred to a device 20A-2. Note that, in the example shown in FIG. 10, the type of the device 20A-1 is a recording device R2-1, and the type of the device 20A-2 is a smartphone S2-1.

For example, when the command is executed by the device 20A-1, a device group selection screen 251 is displayed on the display part 250 of the device 20A-1.

FIG. 11 is a diagram showing a device group selection screen 251 according to the second example. Here, when Father performs operation of selecting the second device group (device group 30B) of Grandfather in the device group selection screen 251, the selection information acquisition part 111 acquires selection information for selecting the second device group. For example, the operation of selecting a device group may be completed by selecting a "select" button 2511. Note that, Father may select the first device group (device group 30A) whose user is Father himself, using the device group selection screen 251. Further, the operation of selecting a device group may not be performed. In this case, the operation of cancelling the selection of a device group may be completed by selecting a "cancel" button 2512, for example.

Next, the device detection part 112 detects a device 20 that is identical or similar to the device 20A-1. For example, the device detection part 112 detects a device 20 that is identical or similar to the device 20A-1 included in the first device group (device group 30A) from the second device group (device group 30B). For example, in the case where the selection information acquisition part 111 acquires selection information for selecting the second device group (device group 30B), the device detection part 112 detects a device 20 that is identical or similar to the device 20A-1 from the second device group (device group 30B) selected based on the selection information. The range of "identical" is the same as in the first example.

Figure 12:
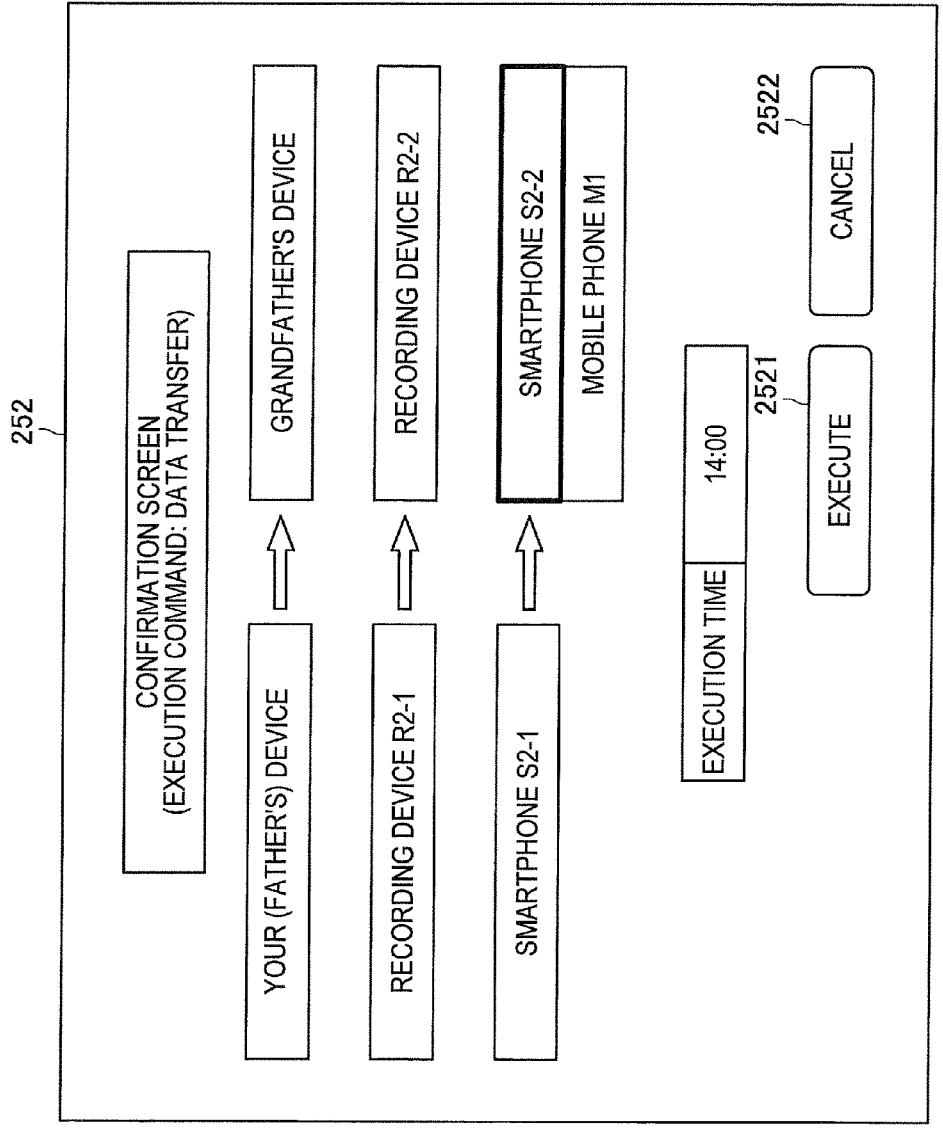
FIG. 12 is a diagram showing a confirmation screen according to the second example.

In the example shown in FIG. 10, the device 20B-1 (second execution device) having a function identical to the function (data transfer) of the device 20A-1 is detected as a device 20 that is similar to the device 20A-1. Note that, in the example shown in FIG. 10, the type of the device 20B-1 is a recording device R2-2. For example, when the device 20B-1 is detected by the device detection part 112, a confirmation screen 252 is displayed on the display part 250 of the device 20A-1. FIG. 12 is a diagram showing the confirmation screen 252 according to the second example.

The display control part 116 may perform control in a manner that the type (recording device R2-2) of the device 20B-1 detected by the device detection part 112 is displayed. For example, the display control part 116 may control the display part 250 in a manner that the type of the device 20B-1 is displayed on the display part 250 of the device 20A-1. In this way, when the type of the device 20B-1 detected by the device detection part 112 is displayed, Father can confirm the detected device 20.

Here, the number of devices 20 that is identical or similar to the device 20A-1 may not be one. Accordingly, for example, in the case where there are one or multiple devices 20 that are identical or similar to the device 20A-1, the device detection part 112 determines a device 20 from the one or multiple devices 20. As a technique for determining a device 20 from the one or multiple devices 20, the same technique can be adopted as the technique shown in the first example.

Heretofore, although examples have been described in which the device detection part 112 detects a device 20 that is identical or similar to a device 20 which executes a command, the device detection part 112 may also detect a device 20 that is identical or similar to a device 20 which is related to a command. For example, in the case where the above-mentioned data transfer is the command, the device 20A-2 (smartphone S2-1) is related to the command. Accordingly, the device detection part 112 may detect a device 20 that is identical or similar to the device 20A-2 (first related device). The range of "identical" and the range of "similar" may be determined in the same manner as the range of "identical" or "similar" with respect to the device 20A-1.

In the example shown in FIG. 10, the device 20B-2 (second related device), which has a function identical to a function (data transfer) of the device 20A-2, is detected as a device 20 that is similar to the device 20A-2. Note that, in the example shown in FIG. 10, the type of the device 20B-2 is a smartphone S2-2. For example, when the device 20B-2 is detected by the device detection part 112, as shown in the confirmation screen 252, the display control part 116 may perform control in a manner that the type (smartphone S2-2) of the device 20B-2 detected by the device detection part 112 is displayed.

The device detection part 112 may detect any device 20 as a device 20 that is identical or similar to the device 20A-2. As a technique for detecting a device 20 that is identical or similar to the device 20A-2, the same technique can be adopted as the technique shown in the first example.

In the example shown in FIG. 10, the device 20B-2 and the device 20B-3, each having a function identical to a function (data storage) of the device 20A-2, are detected as devices 20 that are similar to the device 20A-2. Note that, in the example shown in FIG. 10, the type of the device 20B-2 is the smartphone S2-2. Further, the type of the device 20B-3 is a mobile phone M1.

The display control part 116 may perform control in a manner that the type (smartphone S2-2) of the device 20B-2 detected by the device detection part 112 and the type (mobile phone M1) of the device 20B-3 detected by the device detection part 112 are displayed. For example, the display control part 116 may control the display part 250 in a manner that the type of the device 20B-2 and the type of the device 20B-3 are displayed on the display part 250 of the device 20A-1. In this way, when the type of the device 20B-2 detected by the device detection part 112 and the type of the device 20B-3 detected by the device detection part 112 are displayed, Father can confirm the detected device 20.

Here, the number of devices 20 that is identical or similar to the device 20A-2 may not be one. Accordingly, for example, in the case where there are one or multiple devices 20 that are identical or similar to the device 20A-2, the device detection part 112 determines a device 20 from the one or multiple devices 20. As a technique for determining a device 20 from the one or multiple devices 20, the same technique can be adopted as the technique shown in the first example.

For example, as shown in the confirmation screen 252, the display control part 116 may perform control in a manner that the type (smartphone S2-2) of the device 20B-2 detected by the device detection part 112 and the type (mobile phone M1) of the device 20B-3 detected by the device detection part 112 are displayed. Here, for example, Father can perform operation of selecting the device 20B-2 (smartphone S2-2) or the device 20B-3 (mobile phone M1) on the confirmation screen 252.

Next, the execution information acquisition part 113 acquires execution information indicating whether a command is to be executed by the device 20B-1. For example, when Father performs operation for causing the command to be executed, the execution information indicating that the command is to be executed is acquired by the execution information acquisition part 113. For example, the operation for causing the command to be executed is completed by selecting an "execute" button 2521. Further, the operation for causing the command to be executed may not be performed. In this case, the operation of cancelling the command execution is completed by selecting a "cancel" button 2522.

Here, the execution time acquisition part 114 may also acquire an execution time at which a command is to be executed by the device 20B-1. For example, when Father performs operation of inputting an execution time using the device 20A-1, the execution time is acquired by the execution time acquisition part 114. For example, as the example shown in FIG. 12, the execution time can be input on the confirmation screen 252. Note that the execution time may not particularly be input. In this case, the timing at which the command is executed by the device 20B-1 is not particularly limited.

The execution control part 115 performs control in a manner that a command is executed by the device 20B-1 detected by the device detection part 112. For example, the execution control part 115 may control the device 20B-1 in a manner that the execution of the command (data transfer) is performed by the device 20B-1. Further, in the case where execution information indicates that a command is to be executed by the device 20B-1, the execution control part 115 may control the device 20B-1 in a manner that the command is executed by the device 20B-1. For example, the execution control part 115 may perform control in a manner that the device 20B-1 detected by the device detection part 112 is notified of the command. The notification of the command may be performed by the communication part 120, or may be performed by the device 20A-1.

Further, in the case where the an execution time is acquired by the execution time acquisition part 114, the execution control part 115 may control the device 20B-1 in a manner that a command is executed at the execution time by the device 20B-1. Further, in the case where the device 20B-2 related to a command is detected by the device detection part 112, the execution control part 115 performs control in a manner that the device 20B-2 relates to the execution of the command performed by the device 20B-1. For example, the device 20B-2 may be controlled in a manner that the command (data transfer) for transferring content C1 stored in the device 20B-1 to the device 20B-2 is executed.

As described above, according to the second example, the command that is identical to the command (data transfer) executed in the device group 30A is also executed in the device group 30B. Accordingly, in order to execute the command, it is not necessary to have Grandfather operate the device group 30B, and neither does Father have to operate the device group 30B. Therefore, for example, a command that is identical to a command to be executed by the device 20A-1 can be easily executed by the device 20B-1.

Heretofore, functions of the information processing system 1 according to the second example have been described. Hereinafter, operation of the information processing system 1 according to the second example will be described.

<1-7. Operation of Information Processing System (Second Example)>

Figure 13:
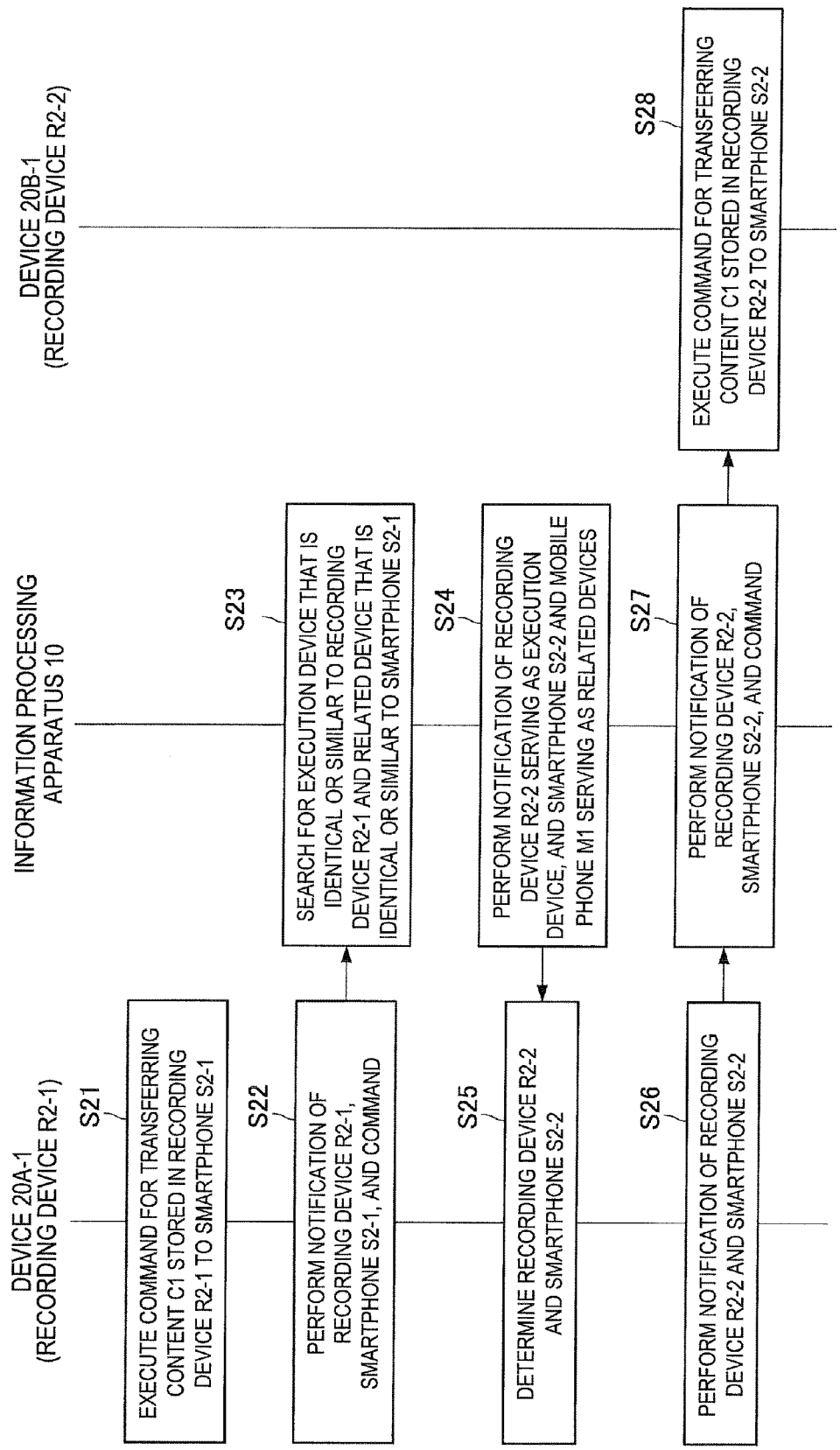
FIG. 13 is a flowchart showing operation in an information processing system according to the second example.

FIG. 13 is a flowchart showing operation of the information processing system 1 according to the second example. Note that, since the operation shown in FIG. 13 is merely an example of the information processing system 1 in the second example, operation of an information processing system 1 according to an embodiment of the present disclosure is not limited to the operation shown in FIG. 13. Further, in the example shown in FIG. 13, a device 20 is specified by the type of the device 20.

As shown in FIG. 13, first, the control part 210 of the recording device R2-1 executes a command for transferring content C1 stored in the recording device R2-1 to the smartphone S2-1 (S21). The command corresponds to the above-mentioned data transfer, and the recording device R2-1 corresponds to the type of the first execution device. Next, the communication part 230 of the recording device R2-1 notifies the information processing apparatus 10 of the recording device R2-1, the smartphone S2-1, and the command (S22). The smartphone S2-1 corresponds to the type of the first related device.

Next, the device detection part 112 of the information processing apparatus 10 searches for an execution device that is identical or similar to the recording device R2-1 and a related device that is identical or similar to the smartphone S2-1 (S23). For example, in the case where selection information for selecting the device group 30B is acquired by the selection information acquisition part 111, the searching for the execution device and the related device is performed from the device group 30B. Here, let us assume that the recording device R2-2 is detected as the execution device that is identical or similar to the recording device R2-1, and the smartphone S2-2 and the mobile phone M1 are detected as related devices that are identical or similar to the smartphone S2-1.

Next, the communication part 120 of the information processing apparatus 10 notifies the recording device R2-1 of the recording device R2-2 serving as the execution device and the smartphone S2-2 and the mobile phone M1, each serving as the related device (S24). Note that, in the case where the device detection part 112 has a function of detecting one related device from multiple related devices, the notification of the recording device R2-2, the smartphone S2-2, and the mobile phone M1 to the recording device R2-1 may not be performed.

Next, the control part 210 of the smartphone S1 determines the recording device R2-2 serving as the second execution device and the smartphone S2-2 serving as the second related device based on operation accepted by the input part 220 (S25). The communication part 230 of the recording device R2-1 notifies the information processing apparatus 10 of the recording device R2-2 and the smartphone S2-2 (S26). Note that, in the example shown in FIG. 13, although the communication part 230 of the recording device R2-1 notifies the information processing apparatus 10 of the recording device R2-2 and the smartphone S2-2, the communication part 230 of the recording device R2-1 may notify the recording device R2-2, without through the information processing apparatus 10, of the recording device R2-2 and the smartphone S2-2. In this case, the communication part 230 of the recording device R2-1 may also notify the recording device R2-2, without through the information processing apparatus 10, of the command.

Next, the communication part 120 of the information processing apparatus 10 notifies the recording device R2-2 of the recording device R2-2, the smartphone S2-2, and the command (S27). The control part 210 of the recording device R2-2 executes the command for transferring content C1 stored in the recording device R2-2 to the smartphone S2-2 (S28). In this way, according to the second example, the command that is identical to the command (data transfer) executed in the device group 30A is also executed in the device group 30B.

Heretofore, operation of the information processing system 1 according to the second example has been described.

<<2. Conclusion>>

As described above, according to the embodiments of the present disclosure, an information processing apparatus is provided, which includes a device detection part configured to detect a second execution device that is identical or similar to a first execution device which executes a command, and an execution control part configured to perform control in a manner that the command is executed by the second execution device detected by the device detection part. According to such a configuration, it is possible to realize technology for causing a command, which is identical to a command to be executed by the first execution device, to be easily executed by the second execution device.

It should be understood by those skilled in the art that various modifications, combinations, sub-combinations and alterations may occur depending on design requirements and other factors insofar as they are within the scope of the appended claims or the equivalents thereof.

Further, the respective steps included in the operation of the information processing system 1 of the present specification are not necessarily processed in a time-series order in accordance with the flowcharts. For example, the respective steps included in the operation of the information processing system 1 may be processed in different order from the flowcharts, or may be processed in a parallel manner.

Further, it is also possible to create a computer program for causing hardware such as a CPU, a ROM, and RAM, which are built in the information processing apparatus 10, to exhibit equivalent functions as those of the structures of the information processing apparatus 10 described above. Further, there is also provided a storage medium having the computer program stored therein.

In the same manner, it is also possible to create a computer program for causing hardware such as the CPU, the ROM, and the RAM, which are built in the device 20, to exhibit equivalent functions as those of the respective structures of the device 20 described above. Further, there is also provided a storage medium having the computer program stored therein.

Additionally, the present technology may also be configured as below.

(1) An information processing apparatus including:

a device detection part configured to detect a second execution device that is identical or similar to a first execution device which executes a command; and an execution control part configured to perform control in a manner that the command is executed by the second execution device detected by the device detection part.

(2) The information processing apparatus according to (1), wherein the device detection part detects a second related device that is identical or similar to a first related device which is related to the command, and wherein the execution control part performs control in a manner that the second related device relates to the execution of the command performed by the second execution device.

(3) The information processing apparatus according to (2), wherein the device detection part detects the second related device usable by the second execution device.

(4) The information processing apparatus according to (3),
wherein the device detection part detects the second related device connectable to the second execution device.
(5) The information processing apparatus according to (3),
wherein the device detection part detects the second related device which supports a protocol that is identical to a protocol which the second execution device supports.
(6) The information processing apparatus according to any one of (2) to (5),
wherein, in a case where there are one or a plurality of related devices that are identical or similar to the first related device, the device detection part determines the second related device from the one or the plurality of related devices.
(7) The information processing apparatus according to any one of (1) to (6), further including
a display control part configured to perform control in a manner that a type of the second execution device detected by the device detection part is displayed.
(8) The information processing apparatus according to (7), further including
an execution information acquisition part configured to acquire execution information indicating whether the command is to be executed by the second execution device,
wherein, in a case where the execution information indicates that the command is to be executed by the second execution device, the execution control part performs control in a manner that the command is executed by the second execution device.
(9) The information processing apparatus according to any one of (1) to (8),
wherein the device detection part detects the second execution device that is identical or similar to the first execution device included in a first device group from a second device group.
(10) The information processing apparatus according to (9), further including
a selection information acquisition part configured to acquire selection information for selecting the second device group,
wherein the device detection part detects the second execution device from the second device group selected based on the selection information.
(11) The information processing apparatus according to any one of (1) to (10),
wherein, in a case where there are one or a plurality of execution devices that are identical or similar to the first execution device, the device detection part determines the second execution device from the one or the plurality of execution devices.
(12) The information processing apparatus according to (11),
wherein the device detection part determines the second execution device from the one or the plurality of execution devices based on operation information input by a user.
(13) The information processing apparatus according to (11),
wherein the device detection part determines the second execution device from the one or the plurality of execution devices based on setting information that is set in advance.
(14) The information processing apparatus according to (11),
wherein the device detection part determines the second execution device from the one or the plurality of execution devices based on a usage status of each of the one or the plurality of execution devices.
(15) The information processing apparatus according to (14),
wherein the device detection part determines the second execution device from the one or the plurality of execution devices based on a usage frequency or a usage time period of each of the one or the plurality of execution devices.
(16) The information processing apparatus according to (14),
wherein, in a case where the one or the plurality of execution devices each have a storage area, the device detection part determines the second execution device from the one or the plurality of execution devices based on an available space in the storage area of each of the one or the plurality of execution devices.
(17) The information processing apparatus according to any one of (1) to (16), further including
an execution time acquisition part configured to acquire an execution time at which the command is to be executed by the second execution device,
wherein the execution control part performs control in a manner that the command is executed at the execution time by the second execution device.
(18) The information processing apparatus according to any one of (1) to (17),
wherein a command executed by the first execution device is a command which has already been executed by the first execution device, a command which is being executed by the first execution device at a present moment, or a command which will be executed by the first execution device in future.
(19) An information processing method including:
detecting a second execution device that is identical or similar to a first execution device which executes a command; and
performing control in a manner that the command is executed by the second execution device.
(20) A program for causing a computer to function as an information processing apparatus including
a device detection part configured to detect a second execution device that is identical or similar to a first execution device which executes a command, and
an execution control part configured to perform control in a manner that the command is executed by the second execution device detected by the device detection part.

The present disclosure contains subject matter related to that disclosed in Japanese Priority Patent Application JP 2012-067035 filed in the Japan Patent Office on Mar. 23, 2012, the entire content of which is hereby incorporated by reference.

What is claimed is:
1. An information processing apparatus comprising:
a circuitry configured to:
detect a plurality of second devices that are identical or similar to a first device,
select a second device of the plurality of second devices based on a usage frequency or a usage time period of each of the plurality of second devices, and
perform control in a manner that a command is executed by the second device instead of the first device,
wherein the circuitry is further configured to perform control in a manner that a type of the second device detected by the circuitry is displayed.
2. The information processing apparatus according to claim 1,
wherein the circuitry is further configured to:

detect a second related device that is identical or similar to a first related device which is related to the command, and perform control in a manner that the second related device relates to the execution of the command performed by the second device.

3. The information processing apparatus according to claim 2, wherein the circuitry is further configured to detect the second related device usable by the second device.

4. The information processing apparatus according to claim 2, wherein, in a case where there are one or more related devices that are identical or similar to the first related device, the circuitry is further configured to determine the second related device from the one or more related devices.

5. The information processing apparatus according to claim 3, wherein the circuitry is further configured to detect the second related device connectable to the second device.

6. The information processing apparatus according to claim 3, wherein the circuitry is further configured to detect the second related device, which supports a protocol that is identical to a protocol that the second device supports.

7. The information processing apparatus according to claim 1, wherein the circuitry is further configured to acquire execution information indicating whether the command is to be executed by the second device, and wherein, in a case where the execution information indicates that the command is to be executed by the second device, the circuitry is further configured to perform control in a manner that the command is executed by the second device.

8. The information processing apparatus according to claim 1, wherein the circuitry is further configured to detect the second device that is identical or similar to the first device included in a plurality of first devices from the plurality of second devices.

9. The information processing apparatus according to claim 8, wherein the circuitry is further configured to:
acquire selection information for selecting the plurality of second devices, and
detect the second device from the plurality of second devices selected based on the selection information.

10. The information processing apparatus according to claim 1, wherein the circuitry is further configured to select the second device from the plurality of second devices based on operation information input by a user.

11. The information processing apparatus according to claim 1, wherein the circuitry is further configured to select the second device from the plurality of second devices based on setting information that is set in advance of selecting.

12. The information processing apparatus according to claim 1, wherein the circuitry is further configured to select the second device from the plurality of second devices based on a usage status of each of the plurality of second devices.

13. The information processing apparatus according to claim 1, wherein, in a case where each of the plurality of second devices has a storage area, the circuitry is further configured to select the second device from the plurality of second devices based on an available space in the storage area of each of the plurality of second devices.

14. An information processing apparatus comprising:
a circuitry configured to:
detect a plurality of second devices that are identical or similar to a first device,
select a second device of the plurality of second devices based on a usage frequency or a usage time period of each of the plurality of second devices, and
perform control in a manner that a command is executed by the second device instead of the first device,
wherein the circuitry is further configured to:
acquire an execution time at which the command is to be executed by the second device, and
perform control in a manner that the command is executed at the execution time by the second device.

15. An information processing apparatus comprising:
a circuitry configured to:
detect a plurality of second devices that are identical or similar to a first device,
select a second device of the plurality of second devices based on a usage frequency
or a usage time period of each of the plurality of second devices, and perform control in a manner that a command is executed by the second device instead of the first device,
wherein the command has already been executed by the first device, is being executed by the first device at a present moment, or will be executed by the first device in a future moment.

* * * * *